United States Patent [19]

Everett, II et al.

[11] Patent Number: 4,921,367

[45] Date of Patent: May 1, 1990

[54] SHAFT COUPLING

[75] Inventors: Benjamin H. Everett, II, Saginaw, Mich.; Robert B. Holben, Palm Beach Garden, Fla.; James B. Swanson, Bay City, Mich.

[73] Assignee: General Motors Corporation, Detroit, Mich.

[21] Appl. No.: 422,272

[22] Filed: Oct. 16, 1989

[51] Int. Cl.5 ............................................. F16B 7/10
[52] U.S. Cl. ................................... 403/106; 403/108; 403/379; 74/492
[58] Field of Search ................. 74/492, 493; 403/104, 403/108, 110, 373, 379, 408.1, 106; 411/546, 547

[56] References Cited

U.S. PATENT DOCUMENTS

| 686,311 | 11/1901 | Leaycraft | 403/379 X |
| 3,545,299 | 12/1970 | Scherenberg | 74/492 |
| 3,955,439 | 5/1976 | Meyer | 74/493 |
| 4,856,927 | 8/1989 | Cusati | 403/104 |

Primary Examiner—Andrew V. Kundrat
Attorney, Agent, or Firm—F. J. Fodale

[57] ABSTRACT

A shaft coupling for a tubular shaft and a member with a collar is disclosed. The shaft coupling includes a U-shaped spacer which has a length such that the spacer can be properly located in the tubular shaft easily. The spacer also includes flares to keep the spacer in place during assembly and operation.

6 Claims, 1 Drawing Sheet

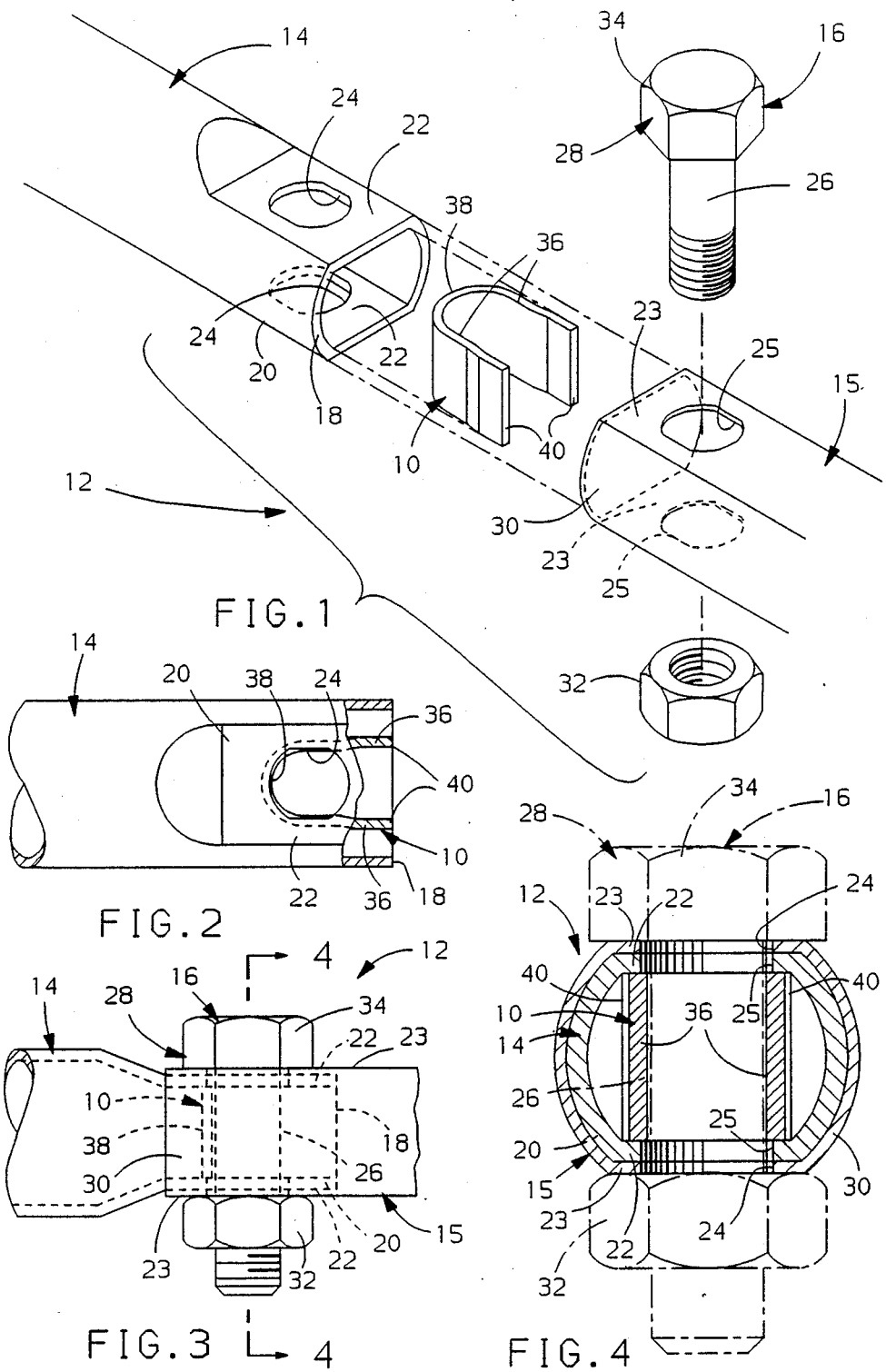

SHAFT COUPLING

BACKGROUND OF THE INVENTION

This invention relates generally to shaft couplings and more specifically to shaft couplings involving tubular shafts which are squeezed by a pinch bolt.

Tubular shafts are often used to transfer torque from one location to another since they can transfer a given torque at a lesser weight than a solid shaft can. Tubular shafts are used often in devices such as steering column assemblies to transfer torque where the tubular shafts are attached to another member, such as another shaft or the housing of a universal joint. A shaft coupling is commonly used for this purpose.

A known shaft coupling comprises a tubular shaft and a housing for a universal joint, both designed to transfer torque. The housing of the universal joint has a collar and the tubular shaft and the collar are attached by a pinch bolt. The tubular shaft includes an end portion which has flat parallel segments opposite each other. The flat parallel segments have aligned bolt holes so that a shank of the pinch bolt may pass through.

The collar for the housing for the universal joint fits over the end portion of the tubular shaft. The collar has flat parallel segments abutting the flat parallel segments of the end portion of the tubular shaft so that torque may be transmitted between the tubular shaft and the collar. The flat parallel segments of the member have bolt holes which are aligned with the bolt holes of the tubular shaft so that the shank of the pinch bolt may pass through the collar and the tubular shaft at the same time. In operation, the end portion of the tubular shaft is fitted inside the collar of the housing, and is attached to the collar by the pinch bolt.

A very tight connection is desired so that the coupling does not become loose after extended periods of operation. Consequently the pinch bolt is torqued down as much as possible in order to extend the useful service life of the shaft coupling. However, there is a practical limit in the prior art shaft coupling because even though the tubular shaft transfers torque well, it does not hold up as well as a solid shaft under the radial forces produced by the pinch bolt. Moreover, if the pinch bolt is torqued down too tight, elastic deformation may occur in the tubular shaft, lowering the area of contact with the collar which shortens the service life and reduces the torque capacity of the shaft coupling. Thus, there is a need to strengthen the tubular shaft so that a larger radial force may be applied and a longer service life and higher torque capacity for the shaft coupling may be achieved.

SUMMARY OF THE INVENTION

An object of the present invention is to provide an improved shaft coupling for tubular shafts that are attached by a pinch bolt.

Another object of the present invention is to provide an improved shaft coupling for tubular shafts which incorporates a spacer to strengthen tubular shafts under a radial load imposed by the shaft coupling.

Yet another object of the present invention is to provide a shaft coupling for tubular shafts which incorporates a spacer which does not require precise measurements to be properly positioned in the tubular shaft during assembly.

Still another object of the present invention is to provide a shaft coupling for tubular shafts which incorporates a spacer that holds itself in place during assembly and operation.

Other objects and features of the invention will become apparent to those skilled in the art as disclosure is made in the following detailed description of a preferred embodiment of the invention which sets forth the best mode of the invention contemplated by the inventors and which is illustrated in the accompanying sheet(s) of drawing.

BRIEF DESCRIPTION OF THE DRAWINGS

FIG. 1 is an exploded perspective view of the shaft coupling of the present invention.

FIG. 2 is a top partially sectioned view of part of the shaft coupling shown in FIG. 1.

FIG. 3 is a side view of the shaft coupling shown in FIG. 1

FIG. 4 is a section view taken along line 4—4 of FIG. 3 looking in the direction of the arrows.

DETAILED DESCRIPTION OF THE PREFERRED EMBODIMENT

Referring now to the drawings, a shaft coupling 12 for a tubular shaft 14 is illustrated in FIG. 1. The shaft coupling 12 comprises the tubular shaft 14 and a member 15, both designed to transfer torque, which are attached by a pinch bolt means 16.

The tubular shaft 14 includes a noncircular end face 18 and end portion 20 at one end of the tubular shaft 14. The noncircular end portion 20 of the tubular shaft 14 has two flat parallel segments 22 opposite each other. These flat parallel segments 22 have aligned bolt holes 24 so that a shank 26 of the pinch bolt means 16 may pass through the end portion 20.

The member 15 may be any torque transferring member such as another shaft or a housing for a universal joint. The member 15 has a collar 30 which fits over the end portion 20 of the tubular shaft 14 and has the same shape. Thus, the collar 30 of the member 15 has two flat parallel segments 23 abutting the flat parallel segments 22 of the end portion 20 of the tubular shaft 14 so that torque may be transmitted between the tubular shaft 14 and the member 15. The flat parallel segments 23 of the member 15 also have bolt holes 25 which are aligned with the bolt holes 24 of the tubular shaft 14 when the end portion 20 is inserted in the collar 30 and attached by the pinch bolt means 16 as shown in FIGS. 3 and 4.

The pinch bolt means 16 fixedly attaches the member 15 to the end portion 20 of the tubular shaft 14. The pinch bolt means 16 comprises a bolt 28 and a nut 32, the bolt 28 having a bolt head 34 and shank 26 which is threaded at its lower end. The shank 26 of the bolt 28 passes through the aligned bolt holes 24, 25 of the tubular shaft 14 and the member 15 and screws into the nut 32. The nut 32 is then tightened down on the bolt 28 to squeeze the collar 30 of the member 15 into tight engagement with the end portion 20 of the tubular shaft 14.

The shaft coupling 12 as thus far described is well known as indicated in the background of the invention. However, the improved shaft coupling 12 of this invention also includes a spacer 10 which reinforces the end portion 20 of the tubular shaft 14 when the pinch bolt means 16 is tightened down.

The spacer 10 is disposed inside the end portion 20 of the tubular shaft 14. The spacer 10 engages the flat parallel segments 22 of the tubular shaft 14 to reinforce the end portion 20 of the tubular shaft 14 when the pinch bolt means 16 exerts a radial force on the shaft coupling.

The spacer 10 comprises a U shaped wall, sized and shaped to fit inside of the end portion 20 of the tubular shaft 14. The U shaped wall has two arms 36 which are connected by a bight 38. When assembled, the bight 38 is positioned so that it embraces the bolt 28 around the shank 26 under the bolt head 34 as shown in FIGS. 3 and 4.

The spacer 10 has a length such that the spacer 10 is properly positioned inside the end portion 20 when the ends of the arms 36 are flush with the end face 18 of the tubular shaft 14 as shown in FIG. 2. This selected length of the spacer 10 helps to keep assembly of the shaft coupling 12 simple, since the spacer 10 can be properly positioned simply by inserting the spacer 10 into the end portion 20 of the tubular shaft 14 until the ends of the arms 36 are flush with the end face 18.

The arms 36 of the U shaped wall include flares 40. These flares 40 are spread apart so that the spacer 10 is force fit into the tubular shaft 14 and the flares 40 press outwardly against the end portion 20. This biased engagement of the flares 40 with the end portion 20 insures that the spacer 10 does not slip inside the tubular shaft 14 during assembly or operation. This biased engagement also helps assembly of the shaft coupling 12 since the spacer 10 will hold itself in place during assembly of the member 15 and the pinch bolt means 16 to the tubular shaft 14.

When the shaft coupling 12 is assembled, the collar 30 of the member 15 fits over the end portion 20 of the tubular shaft 14. The pinch bolt means 16 then fixedly attaches the tubular shaft 14 to the member 15. To do this the shank 26 of the bolt 28 is inserted through the aligned bolt holes 24,25 of the collar 30 and the end portion 20. The nut 32 is then torqued or tightened down on the bolt 28 squeezing the collar 30 of the member 15 into tight engagement with the end portion 20 of the tubular shaft 14.

The pinch bolt means 16 can be torqued to a substantially higher limit than the prior art to increase the service life of the shaft coupling 12 because the spacer 10 reinforces the end portion 20 of the tubular shaft 14 so that it can carry the higher radial forces produced by the pinch bolt means 16. Moreover, the spacer 10 keeps the flat segments 22 of the tubular shaft 14 from deflecting elastically, thereby maintaining a substantial contact with the flat segments 23 of the collar 30. This in turn improves the torque capacity of the shaft coupling 12.

The force fit spacer 10 could be shaped so that the arms 36 merely angle out from the bight 38. However, the use of flares 40 positions more of the spacer 10 under the bolt head 34 where force is applied to the end portion 20 of the tubular shaft 14 thereby maximizing the reinforcement effect of the spacer 10.

The shaft coupling is assembled in the following manner. The spacer 10 is inserted, bight 38 end first, into the end portion 20 and the arms 36 of the spacer 10 are force fit into the tubular shaft 14 until the ends of the arms 36 are flush with the end face 18. This automatically aligns the bight 38 with the aligned bolt holes 24, 25 and automatically positions the bight 38 to embrace the bolt 28 around the shank 26 under the bolt head 34. Moreover, the flares 40 on the arms 36 of the spacer 10 biasingly engage the end portion 20 of the tubular shaft 14 to keep the spacer 10 from slipping during operation of the shaft coupling 12. This also assists in the assembly of the shaft coupling 12 since the spacer 10 will hold itself in place during assembly.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A shaft coupling comprising:
   a tubular shaft having an end portion which has flat parallel segments opposite each other which have aligned bolt holes,
   a member having a collar which fits over the end portion of the tubular shaft and which has flat parallel segments abutting the flat parallel segments of the end portion so that torque may be transmitted between the tubular shaft and the member,
   the flat parallel segments of the member having bolt holes which are aligned with the bolt holes of the tubular shaft,
   pinch bolt means to fixedly attach the member to the end portion of the tubular shaft, the pinch bolt means including a bolt having a shank which passes through the aligned bolt holes of the member and the tubular shaft and a nut which is tightened down on the bolt to squeeze the collar of the connecting member into tight engagement with the end portion of the tubular shaft, and
   a spacer which is disposed inside the end portion of the tubular shaft and engages the flat parallel segments of the tubular shaft to reinforce the end portion of the tubular shaft when the nut is tightened down on the bolt.

2. A shaft coupling comprising:
   a tubular shaft having an end face and an end portion, the end portion having flat parallel segments opposite each other which have aligned bolt holes,
   a member having a collar which fits over the end portion of the tubular shaft and which has flat parallel segments abutting the flat parallel segments of the end portion so that torque may be transmitted between the tubular shaft and the member,
   the flat parallel segments of the member having bolt holes which are aligned with the bolt holes of the tubular shaft,
   pinch bolt means to fixedly attach the member to the end portion of the tubular shaft, the pinch bolt means including a bolt having a shank which passes through the aligned bolt holes of the member and the tubular shaft and a nut which is tightened down on the bolt to squeeze the collar of the member into tight engagement with the end portion of the tubular shaft, and
   a spacer which is disposed inside the end portion of the tubular shaft and engages the flat parallel segments of the tubular shaft to reinforce the end portion of the tubular shaft when the nut is tightened down on the bolt,
   the spacer comprising a U shaped wall having a bight which embraces the shank of the bolt and engages the flat parallel segments of the tubular shaft adjacent to the bolt holes.

3. The shaft coupling as defined in claim 2 wherein the U shaped wall has arms with ends, and the spacer has a length such that the ends of the arms fit flush with the end face of the tubular shaft to position the bight so that it embraces the shank of the bolt.

4. The shaft coupling as defined in claim 2 wherein the spacer is force fit into the end portion of the tubular shaft so that the spacer will not slip inside of the tubular shaft during assembly or operation.

5. The shaft coupling as defined in claim 4 wherein the U shaped wall has arms which include flares which biasingly engage the end portion of the tubular shaft when the spacer is force fit into the end portion of the tubular shaft.

6. A shaft coupling comprising:
   a tubular shaft having an end face and an end portion, the end portion having flat parallel segments opposite each other which have aligned bolt holes,
   a member having a collar which fits over the end portion of the tubular shaft and which has flat parallel segments abutting the flat parallel segments of the end portion so that torque may be transmitted between the tubular shaft and the member,
   the flat parallel segments of the member having bolt holes which are aligned with the bolt holes of the tubular shaft,
   pinch bolt means to fixedly attach the member to the end portion of the tubular shaft, the pinch bolt means including a bolt having a shank which passes through the aligned bolt holes of the member and the tubular shaft and a nut which is tightened down on the bolt to squeeze the collar of the member into tight engagement with the end portion of the tubular shaft, and
   a spacer which is disposed inside the end portion of the tubular shaft and engages the flat parallel segments of the tubular shaft to reinforce the end portion of the tubular shaft when the nut is tightened down on the bolt,
   the spacer comprising a U shaped wall having arms connected by a bight and having a length such that the ends of the arms fit flush with the end face of the tubular shaft to position the bight so that it embraces the bolt around the shank under the bolt head.
   the arms including flares that biasingly engage the end of the tubular shaft so that the spacer will not slip inside of the tubular shaft during assembly or operation.

* * * * *